United States Patent [19]
Debush

[11] Patent Number: 5,305,786
[45] Date of Patent: Apr. 26, 1994

[54] ONE-WAY VALVE ASSEMBLY

[75] Inventor: George Debush, Hamden, Conn.

[73] Assignee: ReSeal International Limited Partnership, New York, N.Y.

[21] Appl. No.: 4,397

[22] Filed: Jan. 14, 1993

[51] Int. Cl.⁵ ............................................. F16K 15/14
[52] U.S. Cl. .............................. 137/512.3; 137/512.4; 137/846; 137/853; 222/490; 222/494
[58] Field of Search .................. 137/512.3, 512.4, 846, 137/853, 860; 222/490, 494; 604/247

[56] References Cited

U.S. PATENT DOCUMENTS

| | | | |
|---|---|---|---|
| 3,631,877 | 1/1972 | Bardsko | 137/512.4 X |
| 4,819,684 | 4/1989 | Zaugg | 137/853 X |
| 4,846,810 | 7/1989 | Gerber | 137/853 X |
| 5,092,855 | 3/1992 | Pardes | 137/853 X |

Primary Examiner—Robert G. Nilson
Attorney, Agent, or Firm—Anderson Kill Olick & Oshinsky

[57] ABSTRACT

A one-way valve assembly including an axially extending valve body having an inlet end and an outlet end and with an expandable elastomeric sleeve tightly fitted about the valve body. A cover member encloses the elastomeric sleeve and valve body and presses the sleeve into fluid-tight contact with the valve body at two axially spaced locations. Further, the cover member is fitted tightly onto the valve body adjacent its inlet end. A flowable substance flows from a source through the valve body passing to the outlet and cannot flow back to the source.

28 Claims, 3 Drawing Sheets

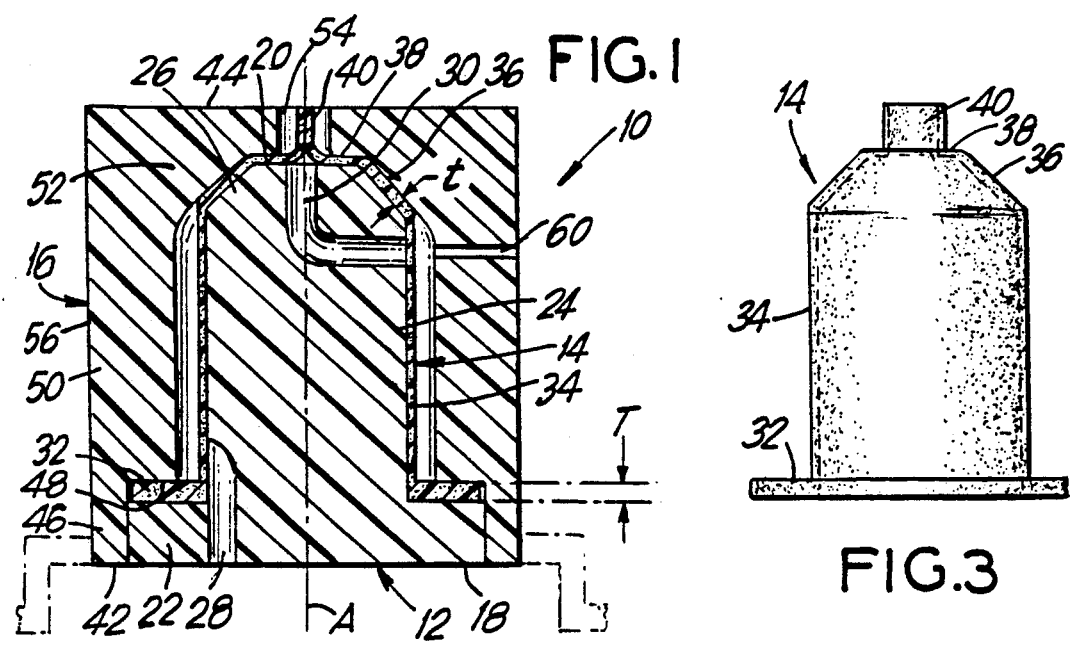
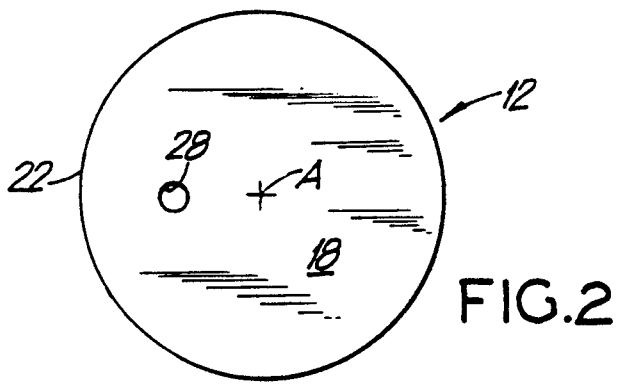
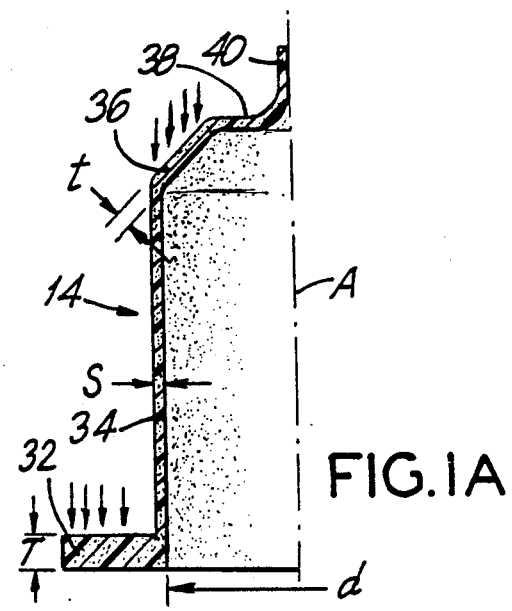
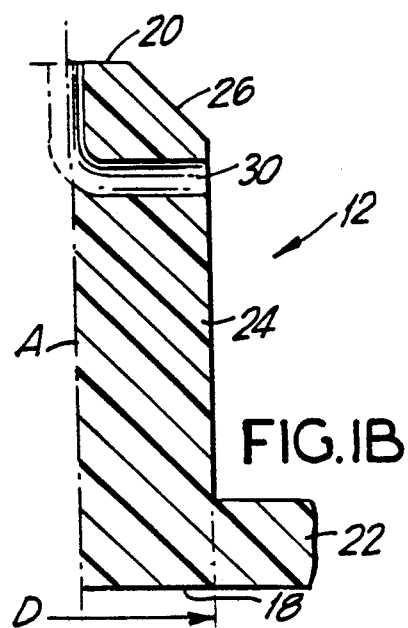

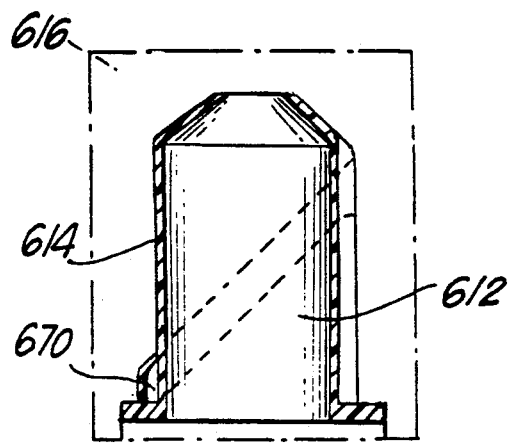
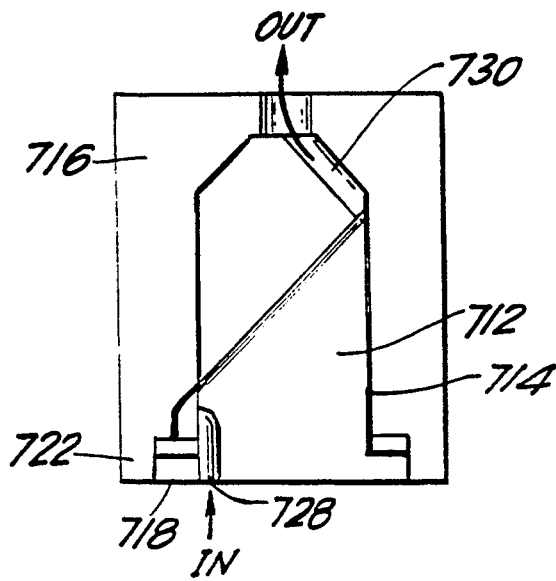
FIG.9A  FIG.10A
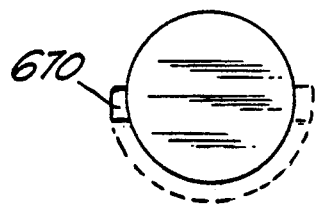
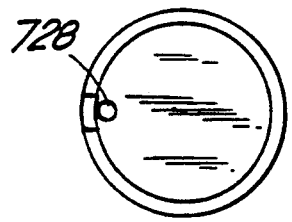
FIG.9B  FIG.10B

ONE-WAY VALVE ASSEMBLY

BACKGROUND OF THE INVENTION

The present invention is directed to a one-way valve assembly including a valve body with an elastomeric member tightly enclosing and sealed to the valve body so that fluid entering between the elastomeric member and the outside surface of the valve body is prevented from bypassing the normal fluid flow path through the valve.

The present invention is an improvement on the one-way valve disclosed in the Gerber patent 4,846,810. In Gerber the elastomeric member is secured to the valve body by O-rings. As indicated in Gerber, it is also possible to secure the elastomeric member to the valve body by various other means such as adhesive material, chemical bonding and the like.

In the patent to Pardes, 5,092,855, an improvement on the Gerber patent, an enclosing sleeve is disclosed with inwardly directed protuberances for sealing the elastomeric member to the valve body. In this patent the protuberances exert a radially inwardly directed force for achieving the sealing effect.

These known one-way valves, while effective for providing one-way flow and preventing contamination from entering into the fluid being dispensed, have a problem in assembling the parts of the valve in a simple and costeffective manner.

SUMMARY OF THE INVENTION

Therefore, the primary object of the present invention is to provide a one-way valve which can be assembled in a cost-effective manner.

Another primary object is to seal the elastomeric member to the valve body in a simple and effective manner to assure that no fluid can leak past the seal.

In accordance with the present invention, the valve assembly consists of three parts, all of which can be formed of recyclable plastic material.

The valve assembly is made up of an inner valve body enclosed within a tightly fitting elastomeric member with a cover member enclosing the elastomeric member and pressing it at two different locations into sealed engagement with the outer surface of the valve body.

In addition to its sealed engagement with the valve body, the elastomeric member can be provided with a duckbill outlet opening. As a result, any contamination such as air, gases, dusts, dirt and the like are prevented from flowing back into the source of the fluid being dispensed by the duckbill closure at the outlet and by the sealed contact between the elastomeric member and the valve body.

The valve body has an inlet end and an outlet end. At one of its inlet end and outlet end the valve body has a radially outwardly directed flange. The valve body extends axially from the flange in a cylindrical form until it approaches the other end where its outside surface tapers inwardly. The elastomeric member has a first end with a radially outwardly extending flange arranged to bear against the flange on the valve body. From the flange the elastomeric member extends axially along and tightly encloses the valve body and terminates at its opposite end. In a preferred embodiment the flange is located at the inlet end and has a duckbill closure at the outlet end.

To complete the valve, a cover member is fitted over the valve body and the elastomeric member and fits tightly against a radially outer surface of the flange at the inlet or outlet end of the valve body. Adjacent the valve body flange, the inner surface of the cover member has an annular shoulder extending transversely of the axial direction of the valve which presses the flange on the elastomeric member into fluid tight sealed contact with the flange on the valve body. Near the opposite end of the valve body, the interior surface of the cover member has an inwardly directed section, such as an outwardly tapering section, which presses the elastomeric member in fluid tight sealed contact with the correspondingly shaped surface of the valve body.

Between the two axially spaced locations where the cover member presses the elastomeric member into sealed contact with the valve body, the inside surface of the cover member is spaced radially outwardly from the elastomeric member. As a result, the annular space within the cover member encircling the elastomeric member provides for radial expansion of the elastomeric member between its two sealed locations with the valve body.

Preferably, the valve assembly is mounted on or in an outlet opening from a fluid source, such as a collapsible container. The valve is secured to the source so that there is no possibility of fluid leaking around the valve or contamination entering into the source at the connection between the valve and the source.

The valve body has an inlet passageway extending from its inlet end to a location opening from the valve body to the inside surface of the elastomeric member. At a location spaced from the inlet passageway there is an outlet passageway opening through the valve body to the inside surface of the elastomeric member. The outlet passageway extends to the outlet end of the valve body. In a preferred embodiment, the outlet end of the valve body can have a duckbill closure aligned with the outlet. Accordingly, when fluid within the source is pressed into the inlet passageway it causes the elastomeric member to expand outwardly into the annular space between the cover member and the inside surface of the elastomeric member. The fluid then flows within the elastomeric member around the outside surface of the valve body into the outlet passageway and finally through the duckbill closure if one is used. When the force causing the elastomeric member to expand radially is discontinued, the elastomeric member returns to its tightly fitting condition about the valve body preventing flow out of the source and preventing any backflow of the fluid through the outlet passage. As a result, no contamination from the ambient atmosphere can enter through the one-way valve into the source.

Initially, at the location where it is sealed to the valve body, the elastomeric member has an increased thickness, that is, at the flange adjacent the inlet or outlet end of the valve body and in the tapered section adjacent the opposite end of the valve body. The increased thickness along with the pressure exerted by the cover member when it is press-fit, snap-fit or welded to the valve body assures that a complete seal is provided.

The elastomeric member can be easily produced by molding and it is possible to use multi-cavity molds even in injection molding of thermoplastic elastomeric materials. A slight draft angle in the range of 2°–10° on the side of the elastomeric sleeve allows for a very fast cycle time in molding the member, however, the elastomeric member can be formed without a draft angle. Due to the flange arrangement on both the valve body and the elastomeric member and the complementary annular shoulder on the cover member, it is possible to automate, at very high speed, the assembly of the elastomeric member and the cover member on the valve body.

As distinguished from the sealing effect achieved in the Gerber and the Pardes patents, in the present invention the pressing direction is uni-directional in the axial direction and not in the radial direction or bi-directional in the axial direction and, as a result, has been found to afford a much more effective and long-lasting seal.

By varying the number, size and configuration of the inlet and outlet passageways through the valve body it is possible to dispense all kinds of fluid media from a low viscous fluid such as water to a very thick or high viscous fluid such as pasta sauces, salsa and the like.

Moreover, different flow rates can be achieved from a single drop to one fluid ounce per second.

In addition, the inlet and outlet passageways can be formed in a simple manner so that the cost of producing the valve body is kept low while the flow of the fluid through the valve body is enhanced.

The elastomeric member can be formed of a thermoplastic or thermosetting plastics material with a durometer of 70(A) maximum. Preferably, the durometer is in the range of 25-55(A).

The thickness dimensions of the different sections of the elastomeric member are selected, in combination with the dimensions of the valve body and the cover member, so that the completely assembled valve assures that adequate sealing action is achieved.

To assure the retention of the cover member in position for maintaining the sealed contact between the elastomeric member and the valve body, the cover member, in its final assembled position, is secured to the valve body by a press fit, snap fit, ultrasonic welding or some similar connection.

Depending on the fluid substance to be dispensed, the flow path of the substance between the valve body and the inside surface of the elastomeric member can be facilitated by shaping the surface of the valve body, such as by a helical groove or the like.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 1 is an axially extending sectional view of a one-way valve assembly embodying the present invention;

FIG. 1A is a partial axially extending cross-sectional view of the elastomeric member;

FIG. 1B is a partial axially extending cross-sectional view of the valve body;

FIG. 2 is a bottom view of the valve body illustrated in FIG. 1;

FIG. 3 is an elevational view of the elastomeric member shown in FIG. 1 and turned through 90 relative to FIG. 1;

FIG. 9A is an elevational view of still another embodiment of the valve body;

FIG. 9B is an inlet end view of the valve body shown in FIG. 9A;

FIG. 10A is a schematic view of a further embodiment of the one-way valve assembly of the present invention; and FIG. 10B is an inlet end view of a part of the one-way valve displayed in FIG. 10A.

DETAILED DESCRIPTION OF THE INVENTION

Figure 4:
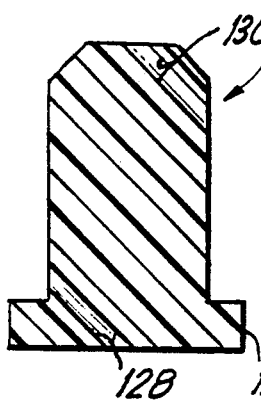
FIG. 4 is an axially extending sectional view of another valve body embodying the present invention illustrating different flow paths for the fluid through the valve body.

In FIG. 1 a one-way valve assembly 10 is illustrated made up of three separate parts, a valve body 12, an elastomeric member 14 and a cover member 16. Both the valve body 12 and the cover member 16 are rigid plastic material parts. The elastomeric member 14, however, is an expandable and compressible part. The three parts can be formed of recyclable plastics materials.

The valve body has an inlet end 18 and an outlet end 20. An axis A extends through the valve assembly from the inlet end 18 to the outlet end 20. Starting at the inlet end 18, the valve body has a radially outwardly extending flange 22 followed in the axial direction by a cylindrically-shaped section 24. At the end of the cylindrical section 24 closer to the outlet end 20 the outside surface of the valve body has an inwardly tapered section 26 ending at the outlet end 20. In place of the tapered section 26 the end of the valve body can be perpendicular to or at least transversely of the axis A.

An inlet passageway 28 extends axially from the inlet end 18 to a point spaced closely axially from the flange 22 with the inlet passageway opening through the surface of the cylindrical section 24. Spaced axially toward the outlet end 20 is an outlet passageway 30 extending from the outside surface of the cylindrical section 24 to the outlet end 20 of the valve body. The inlet passageway 28 and the outlet passageway 30 are spaced angularly apart about the valve assembly axis A.

The elastomeric member 14 is fitted tightly about the cylindrical section 24 of the valve body. As shown in FIG. 3, the elastomeric member 14 has a radially outwardly extending flange section 32. From the flange section 32 the elastomeric member extends axially and has a cylindrical section 34 similar to the cylindrical section 24 of the valve body. At its upper end as viewed in FIG. 3, the elastomeric member has an inwardly tapering section 36 terminating in an end section 38 extending transversely of the valve axis. Extending upwardly from the end section is a duckbill closure 40. Initially at least, the flange section 32 and the tapering section 36 each have an increased thickness T, t, respectively, relative to the thickness S of the cylindrical section 24 for assuring an adequate sealing action in the completely assembled valve.

In FIG. 1A the elastomeric member 14 is shown in cross-section. The arrows indicate the direction of the pressing force of the cover member 16 against the flange 22 and the tapered section 26. The pressing force acts unidirectionally and not in two opposite directions. The original inside diameter $\phi$ d of the elastomeric member 14 is less than the outside diameter $\phi$ D of valve body 12, note FIG. 1B, so that the elastomeric member is stretched tightly on the valve body during the assembly operation.

Enclosing the valve body 12 and the elastomeric member 14 is the cover member 16. Cover member 16 has an inlet end 42 and an outlet end 44. From its inlet end 42, the cover member has an increased inside diameter section 46 encircling the flange section 22 of the valve body. At the upper end of the increased diameter section 46 the cover member has a radially inwardly extending shoulder 48. Above the shoulder 48, the cover member has a cylindrical section 50 with a larger inside diameter than the outside diameter of the elastomeric member 14. At the upper end of section 50 the inside surface of the cover member has an inwardly tapering section 52 terminating in an outlet opening 54 encircling the duckbill closure 40. The outlet end 44 of the cover member 16 extends transversely of the axial direction of the valve. The outside surface 56 of the cover member 16 is cylindrical between the inlet end 42 and the outlet end 44.

In the assembly of the one-way valve 10, the elastomeric member 14 is fitted downwardly over the valve body 12 so that its flange section 32 rests against the upper surface of the flange section 22 of the valve body. Because the inside diameter of the elastomeric member 14 has a smaller diameter d than the diameter D of the valve body in its cylindrical section 24, the elastomeric member is stretched and fits tightly over the valve body. As a result of this tight fit, the elastomeric member forms a closure of the downstream end of the inlet passageway 28 and the upstream end of the outlet passageway 30.

The elastomeric member 14 can be formed in an injection molding operation. The cylindrical section 34 of the elastomeric member can be provided with a slight draft angle in the range of 2°–10° to expedite the molding cycle time.

When the cover member 16 is placed downwardly, as viewed in FIG. 1, over the elastomeric member 14 and the valve body 12 it is pressed downwardly until its inlet end 42 and the inlet end 18 of the valve body are in a common plane. In this position the cover member can be tightly fitted to the flange section 22 of the valve body 14 by a press fit, snap fit by ultrasonic welding or some similar connecting operation. This operation provides an effective, reliable mechanical joint.

As the cover member is pressed downwardly its shoulder 48 compresses the flange section 32 of the elastomeric member 14 and provides a fluid-tight seal between the flange of the elastomeric member and the flange of the valve body. At the same time, the tapered section 38 of the elastomeric member 14 at the upper end of the valve assembly 10 is pressed against the surface of the inwardly tapered section 26 of the valve body by the correspondingly inwardly tapering surface of the tapered section 52 of the cover member 16. As a result, a fluid-tight seal is provided between the section 38 of the elastomeric member and the tapered section 26 of the valve body 12. Accordingly, at the opposite ends of the cylindrical section 24 of the valve body the elastomeric member 14 is in fluid tight sealed contact with the valve body.

Since the inside surface of the cylindrical section 56 of the cover member 16 is spaced outwardly from the outside surface of the elastomeric member 14, an axially extending annular space 58 is provided around he cylindrical section 34 of the elastomeric member 14. A vent opening 60 extends from the annular space 58 to the exterior of the cover member 16.

When the one-way valve assembly 10 is secured to a source such as a collapsible container or flexible container, and fluid is pressed out of the container it flows through the inlet passageway 28 and causes the expandable elastomeric member 14 to move radially outwardly within the space defined outwardly by the inner surface of the cover member 16. The fluid passes from the inlet passageway 28 between the outside surface of the valve body and the inside surface of the elastomeric member until it reaches the outlet passageway 30 and flows out of the valve assembly through the duckbill closure 40 within the outlet opening 54. When the fluid is no longer pressed out of the container, the elastomeric member 14 again moves into tightly fitting contact with the cylindrical section 24 of the valve body and closes off the downstream end of the inlet passageway 28 and the upstream end of the outlet passageway 30. Accordingly, the combination of the duckbill closure 40 and the elastomeric member 14 blocks any backflow into the container and also assure that contaminants cannot flow through the one-way valve back into the container.

The one-way valve assembly 10 can be used with a great variety of fluid substances ranging from low viscosity fluids, such as water, to high viscosity fluids, such as condiments and pastes. The dimensions of the various parts of the one-way valve and particularly of the elastomeric member 14 are established based on the type of fluid substance to be dispensed through the valve. Generally, the durometer of the elastomeric material forming the member 14 is in the range of 25–55(A).

The duckbill closure 40 is dimensioned to open when fluid is pressed out of the one-way valve 10 and to rebound into a closed condition when the fluid is no longer being pressed out of the valve.

In FIG. 4 a valve body 112 is illustrated, similar to that in FIGS. 1–3, however, the arrangement of the inlet passageway 128 and the outlet passageway 130 is different. In FIG. 1 the inlet passageway 28 extends axially and the outlet passageway is generally right angled. In FIG. 4, however, the inlet passageway 128 and the outlet passageway 130 extend at an angle to the axis, generally at about a 45. angle, though other angles could be used. This arrangement simplifies the formation of the passageways, particularly the outlet passageway 130.

Figure 5A:
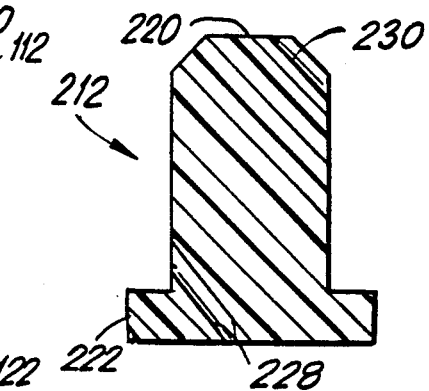
FIGS. 5A and 5B are an axially extending sectional view and an elevational view, respectively, of another embodiment of the valve body.
Figure 5B:
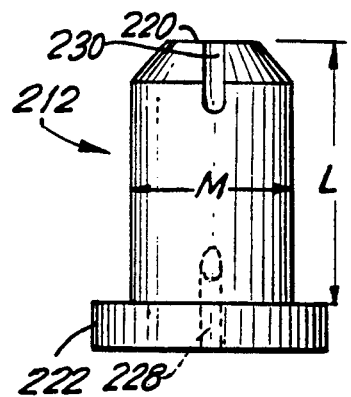

In FIGS. 5A and 5B another arrangement of the passageways through the valve body 212 is shown. The inlet passageway 228 is set at an angle to the axis and the outlet passageway 230 is set at approximately the same angle as the tapered surface so that the elastomeric member, not shown, where it is sealed by the cover member to the valve body. The elastomeric member forms a cover for the passageway 230. In FIG. 5B the location of the outlet passageway 230 is shown in full lines and the location of the inlet passageway 228 is shown in dashed lines. While one inlet passageway 228 and one outlet passageway is shown, a number of each could be used.

The ratio of the diameter of the valve body M to the axial length L of the valve body between the flange 222 and the outlet end 220 can be in a the ratio of 0.25 to 3.0. Again, these dimensions depend on the material to be dispensed and the characteristics or durometer of the elastomeric member.

Figure 6A:
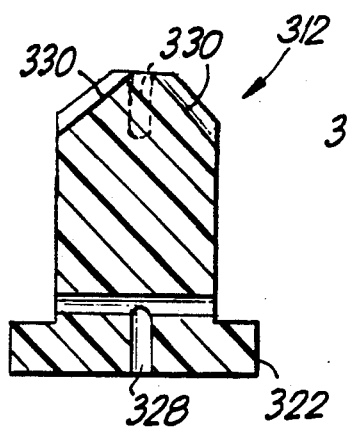
FIGS. 6A and 6B are views similar to FIGS. 5A and 5B showing still another embodiment of the valve body incorporating the present invention.
Figure 6B:
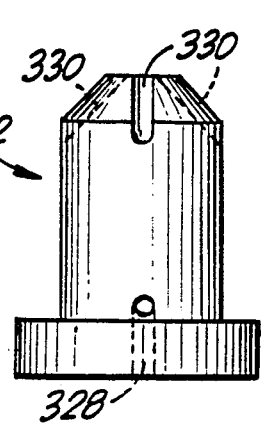

In FIGS. 6A and 6B still another valve body 312 is shown where the inlet passageway extends axially for little more than the axial length of the flange 322 and continues as a crossbore extending approximately perpendicularly to the axis. At the opposite end of the valve body 312 four outlet passageways 330 are arranged each about 90° apart and formed similar to that in FIG. 5A where the elastomeric member, not shown, forms a cover for the outlet passageway. This arrangement increases the flow of the fluid out of the valve.

Figure 7:
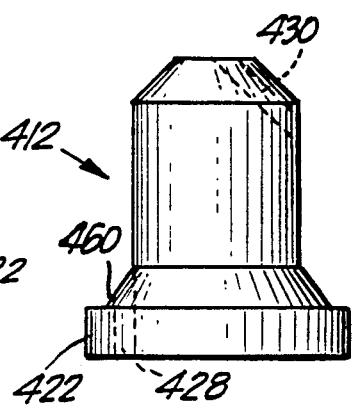
FIG. 7 is an elevational view of a further embodiment of the valve body.

In FIG. 7 yet another embodiment of the valve body 412 is displayed with the inlet passageway shown in dashed lines, offset from the axis of the valve assembly. Unlike the other valve bodies shown, valve body 412 has an inwardly tapering section 460 between the flange section 422 and the cylindrical section. As a result, the downstream end of the inlet passageway 428 is located in the inwardly tapering section 460. The outlet passageway 430 is similar to the outlet passageway 230 in FIG. 5A. This valve body 412 shows an alternate arrangement for the inlet and outlet passageways.

Figure 7A:
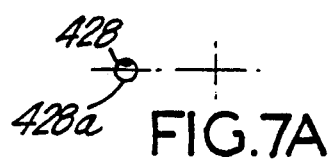
FIGS. 7A, 7B and 7C are inlet end views of the valve body displayed in FIG. 7 illustrating different cross-sectional shapes of the flow passageway.
Figure 7B:
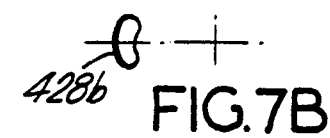
Figure 7C:
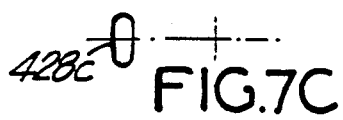

In FIGS. 7A, 7B and 7C different cross-sectional shapes of the inlet passageway 428 are shown. In FIG. 7A the cross-section 428a of the inlet passageway 428 is circular while in FIG. 7B the cross-section 428b is kidney-shaped and in FIG. 7C the cross-section 428c is oval-shaped. These shapes are based upon the type of fluid being dispensed through the one-way valve assembly. In one embodiment a combination of the different shapes could be used.

Figure 8:
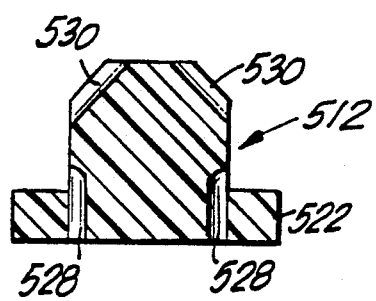
FIG. 8 is an axially extending sectional view of a valve body embodying the present invention having a reduced axial length as compared to the other valve bodies.

In FIG. 8, the valve body 512 is shorter in the axial direction than the other valve bodies, though it has the same general surface features. The inlet passageways 528 are located at the radially outer part of the main body of the valve body, that is, immediately inward of the flange section 522. The outlet passageways are similar to those shown in FIG. 5A. With the multiple inlet passageways 528 and outlet passageways 530, the amount of fluid passed through the one-way valve assembly can be increased.

In FIGS. 9A and 9B another valve body 612 is displayed with the cover member 616 forming a recess to receive the elastomeric member 614 to provide a passageway 670 extending angularly upwardly and around half of the valve body, note FIG. 9B. When the fluid is pressed out of the container, not shown, it enters the passageway 670 and flows to the outlet end of the valve body.

In FIGS. 10A and 10B another embodiment of the valve assembly shown in FIG. 1 is illustrated. The cover member 716 is shown schematically and forms a recess to receive the elastomeric member 714. The inlet passageway 728 extends axially from the inlet end 718 of the valve body just inwardly from the flange section 722. As the fluid expands the elastomeric member 714 with the recess in the cover member 716, it flows into a passageway extending in a helical fashion around the surface of the valve body 712. Opposite the inlet the recess extends along the axial length of the valve body 712 to the outlet passageway 730. The flow out of the valve body through the outlet passageway 730 is similar to that as shown in FIG. 5A. This embodiment affords ease of manipulation and assures that the fluid being dispensed is forced along the valve body 712.

The individual parts of the one-way valve assembly can be easily produced and then assembled in a simple and cost-effective manner. The sealing action afforded by pressing the cover member onto the flange end of the valve body and securing the two parts together in a sealed manner assures that during the useful lifetime the valve operates effectively and without any possibility of contamination entering from the outlet back through the valve body into the source of the fluid being dispensed.

While specific embodiments of the invention have been shown and described in detail to illustrate the inventive principles, it will be understood that the invention may be embodied otherwise without departing from such principles.

I claim:

1. One-way valve assembly for dispensing a flowable substance, comprising a valve body having an inlet arranged to receive the flowable substance from a source and an outlet spaced from the inlet for dispensing the fluid, said valve body has an exterior surface extending in the direction form the inlet toward the outlet, a first passageway in said valve body extends from said inlet through said exterior surface, a second passageway in said valve body extends from the exterior surface through said valve body to said outlet, said first and second passageways are disposed in spaced relation at the exterior surface, a radially expandable sleeve-like elastomeric member is tightly fitted over at least a part of said exterior surface and covers the first and second passageways at said exterior surface, said elastomeric member having a first section closer to said inlet and a second section closer to said outlet with said first and second sections spaced apart in the direction from the inlet to the outlet, a cover member encloses at least part of said elastomeric member and valve body, said cover member is secured to and is in tightly fitted surface contact with said valve body adjacent said inlet and compresses said first and second sections of said elastomeric member in the axial direction toward said inlet into sealing contact with said valve body between said inlet and first passageway extending through said exterior surface and between said outlet and said second passageway extending through said exterior surface, whereby the flowable substance can pass only from the inlet through said first passageway expanding the elastomeric member and permitting the flowable substance to enter the second passageway and exit through the outlet.

2. One-way valve assembly, as set forth in claim 1, wherein said valve body extends axially in the direction from the inlet to the outlet, said valve body having a first surface adjacent said inlet extending transversely of the axial direction and a second surface adjacent the outlet extending transversely of the axial direction and said cover member compresses said first section of said elastomeric member against the first surface of said valve body and said second section of said elastomeric member against the second surface of said valve body for providing a fluid tight seal between said elastomeric member and said valve body.

3. One-way valve assembly, as set forth in claim 1, wherein said valve body extends axially in the direction from the inlet to the outlet, said valve body has a flange section adjacent said inlet forming a first surface facing in the axial direction toward said outlet, said flange section has a radially outer diameter, said valve body includes an axially extending cylindrical section extending from said flange section toward said outlet, and a tapered section adjacent said outlet extending from said cylindrical section and tapering inwardly toward said axis.

4. One-way valve assembly, as set forth in claim 3, wherein said elastomeric member has a first end closer to the inlet of said valve body and a second end adjacent the outlet of said valve body, said elastomeric member has a radially outwardly projecting flange section at the first end thereof said elastomeric member flange section bears against said first surface on said flange section of said valve body, said elastomeric member has a cylindrical section extending axially from said flange section toward the second end, said cylindrical section has an inside diameter less than the diameter of said cylindrical section of said valve body so that said cylindrical section of said elastomeric member fits tightly about the cylindrical section of said valve body, said cylindrical section of said elastomeric member covers and seals said first and second passageways at the exterior surface of said valve body, said elastomeric member has a tapered surface extending inwardly toward the axis of said valve body from an end of said cylindrical section closer to the outlet of said valve body.

5. One-way valve assembly, as set forth in claim 4, wherein said cover member has a first end adjacent the inlet of said valve body and a second end adjacent the outlet of said valve body, said cover member has a first axially extending inside surface extending from said first end toward said second end with said first inside surface having a larger diameter than the remaining inside surface of said cover member and said larger diameter corresponds substantially to the radially outer diameter of the flange section of said valve body, said cover member has a shoulder spaced radially from the first end thereof and extending inwardly from said first surface thereof with a radially inner end of said shoulder spaced radially outwardly from the cylindrical section of said elastomeric member, and said flange section of said elastomeric member fitted between said shoulder and said flange section of said valve member with said cover member compressing said flange section of said elastomeric member into sealed contact with said flange section of said valve body.

6. One-way valve assembly, as set forth in claim 5, wherein said valve cover has an inwardly tapering second inside surface spaced axially from said shoulder and contacting said inwardly tapering section of said elastomeric member and compressing said inwardly tapered section of said elastomeric member into fluid tight sealed contact with the inwardly tapered section on said valve body.

7. One-way valve assembly, as set forth in claim 6, wherein second inside surface of said cover member extending axially between said shoulder and said inwardly tapering second inside surface extends generally cylindrically therebetween and is spaced radially outwardly from the outer surface of said elastomeric member, whereby said elastomeric member in the axially extending cylindrical region of said cover member can expand radially outwardly when fluid is pressed through said valve body.

8. One-way valve assembly, as set forth in claim 7, wherein said elastomeric member forms a closure axially outwardly from said valve body outlet for preventing backflow through said closure.

9. One-way valve assembly, as set forth in claim 8, wherein said elastomeric member closure is a duckbill closure.

10. One-way valve assembly, as set forth in claim 9, wherein said duckbill closure is located within an opening extending axially outwardly through said cover member from said outlet of said valve body.

11. One-way valve assembly, as set forth in claim 6, wherein said flange section and said inwardly tapered section of said elastomeric member has a thickness greater than the cylindrical section of said elastomeric member and said flange section and said inwardly tapered section are compressed by said cover member.

12. One-way valve assembly, as set forth in claim 7, wherein said cover member is secured to said flange section of said valve body by a press fit.

13. One-way valve assembly, as set forth in claim 7, wherein said cover member is welded to said flange section of said valve body.

14. One-way valve assembly, as set forth in claim 3, wherein said first passageway extends axially through said valve body from said inlet to the exterior surface of said valve body and said second passageway extends radially inwardly from the exterior surface of said valve body and then in the axial direction of said valve body to said outlet.

15. One-way valve assembly, as set forth in claim 3, wherein first passageway and second passageway extend at an oblique angle relative to the axis of said valve body.

16. One-way valve assembly, as set forth in claim 3, wherein said second passageway is formed as an open groove in said inwardly tapered section of said valve body and said elastomeric member forms a closure for said second passageway and is pressed inwardly against the open groove by said cover member.

17. One-way valve assembly, as set forth in claim 3, wherein a plurality of first passageways and second passageways are located in said valve body.

18. One-way valve assembly, as set forth in claim 3, wherein said first passageway extends axially from said inlet into said valve body and branches into a plurality of partial first passageways extending from said axially extending first passageway radially to the exterior surface of said valve body.

19. One-way valve assembly, as set forth in claim 3, wherein said first passageway has a circular transverse cross-section.

20. One-way valve assembly, as set forth in claim 3, wherein said first passageway has a kidney-shaped transverse cross-section.

21. One-way valve assembly, as set forth in claim 3, wherein said first passageway has a oval-shaped cross-section.

22. One-way valve assembly, as set forth in claim 3, wherein said valve body has a diameter of said cylindrical section and a length from said flange section to said outlet with the diameter of the cylindrical section in a ratio of 0 25 : 3 with said length of said valve body between said flange section and said outlet of said valve body.

23. One-way valve assembly, as set forth in claim 4, wherein said elastomeric member and said exterior surface of said valve body form a passageway extending at least partially helically about said valve body.

24. One-way valve assembly for dispensing a flowable substance from a source and for preventing backflow of the flowable substance and ambient contaminants into the source, comprising a rigid valve body having an inlet and an outlet spaced from said inlet, said valve body having an exterior surface and an annular flange projecting outwardly from said exterior surface adjacent said inlet, an expandable elastomeric sleeve laterally enclosing and tightly fitted over the exterior surface of said valve body, said elastomeric sleeve having an inside surface and an outside surface and a flange projecting outwardly from said outside surface and bearing against said flange on said valve body, a rigid cover member laterally enclosing said elastomeric sleeve and having an inside surface and an outside surface and a shoulder in the inside surface spaced from said inlet and arranged to compress said flange on said elastomeric sleeve into fluid tight contact with said flange on said valve body, a section of the inside surface of said cover member extending from said shoulder in the direction toward the inlet of said valve body being disposed in tightly fitted contact with a surface of said flange on said valve body for securing said cover member to said valve body, said cover member at a spaced location from said flange on said valve body and adjacent said outlet compresses said elastomeric sleeve into fluid tight sealed contact with said valve body, a first passageway in said valve body extending from said inlet through said valve body to the inside surface of said elastomeric sleeve, a second passageway in said valve body extending from said inside surface of said elastomeric sleeve to said outlet, said inlet passageway and outlet passageway being in spaced-apart relation at the inside surface of said elastomeric sleeve whereby fluid pressed from said inlet into said valve body expands said elastomeric sleeve permitting flow from said inlet passageway to said outlet passageway and then out of said outlet and when said flow is completed said elastomeric sleeve returns into tightly fitting contact forming a sealed closure to said inlet passageway and outlet passageway.

25. One-way valve assembly, as set forth in claim 24, wherein said valve body, said elastomeric sleeve and said cover member have a common axis and each extends in the direction of the common axis, said inlet and outlet of said valve body being spaced apart in the axial direction, said flange on said valve body, said flange on said elastomeric sleeve and said shoulder on said cover member extend transversely of the axial direction, and said valve body, elastomeric sleeve and cover member each having a complementary tapered surface extending inwardly toward said axis adjacent the outlet with said cover member pressing said elastomeric sleeve into fluid tight sealed contact with said valve body at the inwardly tapered surfaces thereof.

26. One-way valve assembly, as set forth in claim 25, wherein said cover member has an axially extending opening projecting axially outwardly from said outlet of said valve body, said elastomeric sleeve has a closure within said opening spaced axially outwardly from said outlet of said valve body, so that said closure opens when fluid is pressed through said valve body and returns to a closed position when the fluid flow terminates.

27. One-way valve assembly, as set forth in claim 26, wherein said closure on said elastomeric sleeve is a duckbill closure.

28. One-way valve assembly, as set forth in claim 27, wherein said elastomeric sleeve has a first thickness extending between said flange thereon and said inwardly tapered surface thereof, said flange of said elastomeric sleeve has a second thickness greater than said first thickness, said inwardly tapered surface on said elastomeric sleeve has a third thickness greater than said first thickness and said cover member compresses said second and third thickness of said elastomeric sleeve in pressing said elastomeric sleeve flange and inwardly tapered surface into fluid tight sealed contact with said valve body.

* * * * *